United States Patent [19]
Pitcher et al.

[11] Patent Number: 5,790,554
[45] Date of Patent: Aug. 4, 1998

[54] METHOD AND APPARATUS FOR PROCESSING DATA PACKETS IN A NETWORK

[75] Inventors: Derek H. Pitcher, Newark; Earl Ferguson, Sunnyvale, both of Calif.

[73] Assignee: Bay Networks, Inc., Santa Clara, Calif.

[21] Appl. No.: 538,921

[22] Filed: Oct. 4, 1995

[51] Int. Cl.⁶ .................................................. H04J 3/24
[52] U.S. Cl. ........................... 370/471; 370/389; 370/394
[58] Field of Search ........................... 370/389, 395, 370/401, 404, 405, 409, 471, 394, 355, 356

[56] References Cited

U.S. PATENT DOCUMENTS

| | | | |
|---|---|---|---|
| 5,210,748 | 5/1993 | Onishi et al. | 370/405 |
| 5,398,245 | 3/1995 | Harriman, Jr. | 370/394 |
| 5,432,907 | 7/1995 | Picazo, Jr. et al. | 370/404 |
| 5,530,703 | 6/1996 | Liu et al. | 370/409 |
| 5,594,728 | 1/1997 | Hershey et al. | 370/471 |

OTHER PUBLICATIONS

"Create Access Lists," pp. 17–18, Chapter 5—Managing the System, Router Products Configuration Guide, Cisco Systems.

"Filter Transparently Bridged Packets," pp.10–11, Chapter 21—Configuring Transparent Bridging, Cisco Systems.

*Primary Examiner*—Douglas W. Olms
*Assistant Examiner*—Shick Hom
*Attorney, Agent, or Firm*—Blakely, Sokoloff, Taylor & Zafman, LLP

[57] ABSTRACT

A method and apparatus for filtering data packets from a network device, such as a LAN switch, onto a network coupled thereto based on the content of the data packets. A pattern is defined and a forwarding action performed on data packets whose contents match or do not match the pattern, according to a specified condition. Filters may be configured on a per port basis, i.e., a filter can be applied to data packets entering or exiting a specific port on a networking device such as a LAN switch. A data packet received or transmitted at a port of a network device whose contents meet a condition specified by a filter may be processed in a number of ways: the packet may be forwarded to a normal destination port according to normal forwarding rules, forwarded to additional destination ports, forwarded to a monitor destination port, dropped, or subjected to another filter. The next filter may define a different forwarding action for data packets that do not meet the condition specified by the present filter.

29 Claims, 4 Drawing Sheets

| PACKET FILTERS | | | | | | | | | | |
|---|---|---|---|---|---|---|---|---|---|---|
| NAME | SEQ | TYPE | OFFSET | VALUE (HEX) | COND | MATCH | FAIL | FWD | MON DEST | ADDL DEST |
| FLTR_001 | 1 | LLC | 0 | AA.AA.03.00.00.00.81.37 | EQ | 2 | 255 | NORM | | |
| | 2 | LLC | 16 | 04.52 | EQ | 3 | 255 | NORM | | |
| | 3 | LLC | 22 | 00.07 | EQ | 0 | 255 | ALT | | 2:3,2:4 |
| FLTR_002 | 1 | MAC | 2 | 00.80.00.02.31.54 | EQ | 255 | 255 | NORM | 2:1 | |
| FLTR_003 | 1 | LLC | 0 | AA.AA.03.00.00.00.08.00 | EQ | 0 | 255 | DROP | | |

[ADD FILTER] [ADD SEQ] [DELETE SEQ]

| PACKET FILTERS | | | | | | | | | |
|---|---|---|---|---|---|---|---|---|---|
| NAME | SEQ | TYPE | OFFSET | VALUE (HEX) | COND | MATCH | FAIL | FWD | MON DEST | ADDL DEST |
| FLTR_001 | 1 | LLC | 0 | AA.AA.03.00.00.00.81.37 | EQ | 2 | 255 | NORM | | |
| | 2 | LLC | 16 | 04.52 | EQ | 3 | 255 | NORM | | |
| | 3 | LLC | 22 | 00.07 | EQ | 0 | 255 | ALT | | 2.3.2.4 |
| FLTR_002 | 1 | MAC | 2 | 00.80.00.02.31.54 | EQ | 255 | 255 | NORM | 2:1 | |
| FLTR_003 | 1 | LLC | 0 | AA.AA.03.00.00.00.08.00 | EQ | 0 | 255 | DROP | | |

[ADD FILTER] [ADD SEQ] [DELETE SEQ]

METHOD AND APPARATUS FOR PROCESSING DATA PACKETS IN A NETWORK

COPYRIGHT NOTICE

Contained herein is material which is subject to copyright protection. The copyright owner has no objection to the facsimile reproduction of the patent disclosure by any person as it appears in the patent and Trademark Office patent files or records, but otherwise reserves all rights to the copyright whatsoever.

BACKGROUND OF THE INVENTION

1. Field of the Invention

The present invention relates to the field of data networking. Specifically, the present invention relates to a method and apparatus for controlling the forwarding of data packets from a network device, such as a network switch, onto a network coupled thereto based on the content of the data packets.

LAN Management

Many installed local area networks (LANs) are strained because of growing bandwidth demands from increasingly powerful applications and desktop devices, greater numbers of connected devices, and more communication across geographical boundaries. To continue satisfying the growing demands of client/server computing, networking devices such as bridges, routers, hubs, and LAN switches are installed. A common strategy to reduce traffic in a congested LAN is to segment the LAN into smaller LANs so that bandwidth is shared among fewer users. Carried to its end, segmentation results in each LAN having only one device attached, for example, a single server or workstation.

Traditional bridges and routers are no longer the most economical means of internetworking a growing number of LAN segments. Bridges have limited performance, configurability, and topological support. Routers offer greater throughput and scalability, but are more expensive in terms of equipment and administrative costs.

Most networks have many-to-one traffic patterns, which create congestion on the LAN backbone and centralized servers. The congestion increases as the network is segmented and more traffic traverses the backbone. Traditional solutions, such FDDI or collapsed-backbone routers, are expensive, increase the complexity of the network, have limited scalability, and are not cost-effective for increasing the bandwidth to servers and high performance workstations.

Network administrators or managers need the ability to scale bandwidth capacity to accommodate more devices and to meet the changing needs of an organization. Moreover, network administration is becoming more time consuming, because of the growing number of devices and LAN segments increase the complexity of network configuration, performance tuning, troubleshooting, and address management. Furthermore, physical network partitioning complicates the tasks of adding users and changing their locations a growing requirement as organizations become more mobile.

In a hierarchical, centralized network topology, a client station and its server may be separated by several bridge or router hops. Packets may be delayed at each hop. Traditional bridges and routers cannot sustain their throughput at high utilization rates and begin dropping packets. This results in network delays and retransmissions, which degrade application response time and may cause application timeouts.

Recently, organizations may have selectively upgraded segments of their large data internetwork to Asynchronous Transfer Mode (ATM) network segments to improve the productivity of users who can take advantage of its high speed and low latency. However, many users do not yet need the power provided by ATM. Thus, organizations need a way to improve bandwidth utilization of existing LAN segments while selectively upgrading certain users to ATM in the network. It is advantageous for the upgrade to be accomplished in an evolutionary manner while preserving investments in networking adapters, wiring, management tools, and training.

LAN Switching and ATM

Networking devices such as, for example, a LAN switch, address the challenges of LAN management by combining LAN switching and ATM. LAN switches are well known in the art. A well-known embodiment of an LAN switch is the Speed Switch 100™, available from Bay Networks, Inc. of Santa Clara, Calif., the assignee of the present invention. The Speed Switch 100 is a backplane-based switching hub having an ATM core fabric at its backplane. In one embodiment, the Speed Switch 100 allows up to 6 switching modules, each autonomous LAN or ATM switches, to be plugged into the Speed Switch. Modules with different types of LAN and ATM media interfaces can be plugged in to create a switched LAN backbone. The various modules may support, for example, ATM, Ethernet (or other CSMA/CD protocols), FDDI and Token Ring networks. Each switch module has multiple I/O interfaces, i.e., ports, and switching hardware that switches traffic among the local I/O ports.

LAN switching is a third-generation internetworking technology for interconnecting large number of LAN segments at wire speed, with no performance degradation at peak load. LAN switching is a very effective technology for addressing the problems discussed above with respect to LAN management. Unlike traditional bridges, LAN switches can scale to support very large and complex network technologies.

Moreover, unlike routers, LAN switches operate at the MAC sublayer of the Data Link layer (layer 2) of the OSI model and are, thus, transparent to networking (layer 3) protocols. LAN switches reduce forwarding latency experienced by traditional routers because they do not have to provide complex network protocol support, and many functions are implemented in hardware rather than software.

LAN switches are less expensive that traditional bridges and routers because much of their functionality may be implemented by hardware, making them a cost effective way to interconnect many segments. High powered workstations and servers may be connected directly to the LAN switch to provide dedicated bandwidth, while devices having lower bandwidth demands can continue to share LAN segments coupled to the switch. As high bandwidth needs arise, the shared LANs can be segmented until all users eventually receive dedicated segments.

LAN switches can replace or supplement existing network equipment. Because LAN switches have higher capacity and port density than bridges, LAN switches are good replacements for clusters of local bridges. They augment router networks by offloading the packet forwarding function so that the router can focus on routing. Using in conjunction with routers, LAN switches enlarge router subnets, flatten the internetwork, simplify management, and reduce the cost of internetworking.

2. Description of the Related Art

A technique that has been employed by prior art network devices such as a LAN switch involves access lists, or filters, that allow the network administrator to control the forwarding of packets from a network device based upon the contents of the data packet. Such access lists allow a user to define a value within a specific field of a data packet. For example, to filter on an Internet protocol (IP) data packet with an IP address of 129.1.1.1, a user may configure and then apply to a particular port an access list that forwards or drops data packets having a value of 129.1.1.1 in the IP header of the data packet.

prior art techniques also allow filtering on an arbitrary offset within a packet. However, these techniques do not allow filtering on the contents of well known variable length fields, e.g., the routing information field (RIF) of an IEEE 802.5 token ring data packet.

Prior art filtering mechanisms allow for the application of multiple filters to the same data packet; however, the filters are applied in sequential order—no skipping to other filters is allowed. As soon as a match is found, no further filters are considered and the packet is processed according to the filter for which a match occurred. The only processing provided is to either permit the packet to be forwarded or drop the packet. There is no mechanism by which the data packet may be redirected to a port of the network device other than the normal destination port to which the packet is forwarded in the absence of an access list or filter, nor is a packet redirected to multiple destination ports.

There are a number of disadvantages to the above approach for controlling the flow of data packets in a network device. A network administrator must specify a well known field based on an access list type, i.e., the manager is not allowed to specify an arbitrary offset within the data packet at which to compare the contents of the data packet to a value specified by the filter. Moreover, a filter cannot jump to another filter, rather, filters are applied according to the order in which they are configured in the network device. Furthermore, prior art filtering systems do not allow forwarding of a data packet to an alternative port or an additional port. The packets may only be forwarded to the normal destination port or dropped. Finally, filters heretofore have only allowed the logical operators equal and not equal in determining whether a value specified by the filter matches or fails to match the contents of a data packet at the location in the packet specified by the filter. The additional logical operators of less than, less than or equal to, greater than, and greater than or equal to, have not been permissible.

SUMMARY OF THE DISCLOSURE

The present invention relates to the field of data networking. Specifically, the present invention relates to a method and apparatus for filtering, i.e., controlling the forwarding of, data packets from a network device, such as a LAN switch, onto a network coupled thereto based on the content of the data packets. An embodiment of the present invention defines a pattern and performs a forwarding action specified for packets whose contents match or do not match the pattern, according to a specified condition. Such filters may be configured on a per port basis, i.e., a filter can be applied to data packets entering or exiting a specific port on a networking device such as a LAN switch. A data packet received or transmitted at a port of a network device whose contents meet a condition specified by a filter may be forwarded to a normal destination port according to normal forwarding rules, forwarded to additional destination ports, forwarded to a monitor destination port, dropped, or subjected to another filter. (It should be noted that the normal destination port or ports may be determined by standard forwarding rules, for example, transparent or source route bridging rules, routing rules, or proprietary forwarding rules). The next filter may define a different forwarding action for data packets that do not meet the condition specified by the present filter.

Filtering data packets received or transmitted on a port of a network device in this manner provides the network administrator with the capability to, among other applications, analyze network performance by routing a copy of the real time traffic to a LAN analyzer attached to another port on the network device; monitor backbone bandwidth utilization by copying traffic to a port to which is coupled a user accounting server in addition to the intended destination port; control traffic flow by redirecting data packets that meet a certain condition to a specified destination port other than or in addition to the normal destination port or ports based on the destination address of the packet, e.g., the destination MAC address of an Ethernet or Token Ring data packet. (It should be noted that filtering, as that term is used herein, applies to user-defined filters, i.e., filters based on criteria defined by a network administrator other than, or in addition to, the fundamental guidelines by which a network device forwards data packets, e.g., based on the destination MAC address.

It is an object of the invention to control a network device such as a LAN switch to forward certain data packets to a specified set of destination ports or to drop the packet. The ability to control a network device in this manner enables a network administrator to limit broadcast packets, control access to individual network segments coupled to the network device, redirect traffic to ports on the device other than or in addition to the normal destination port (or ports, for example, when transmitting multicast packets) and trace traffic for analysis.

It is yet another object of the invention to apply multiple filters to packets such that each filter may identify a subsequent filter to apply to the packet. The filters may specify that packets should be forwarded to a normal destination port (the port or ports to which a device having the MAC address specified in the destination MAC address field of a data packet is attached), an alternative destination port, additional destination ports, or dropped.

BRIEF DESCRIPTION OF THE DRAWINGS

The present invention is illustrated by way of example and not limitation in the following figures. Like references indicate similar elements, in which.

DETAILED DESCRIPTION OF THE EMBODIMENTS OF THE INVENTION

What is described herein is a method and apparatus for filtering, i.e., controlling the forwarding of, data packets received at a port of a network device, such as a LAN switch, to a destination port on the device based on the content of the data packets. In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

Network Management Station Configuration

Figure 1:
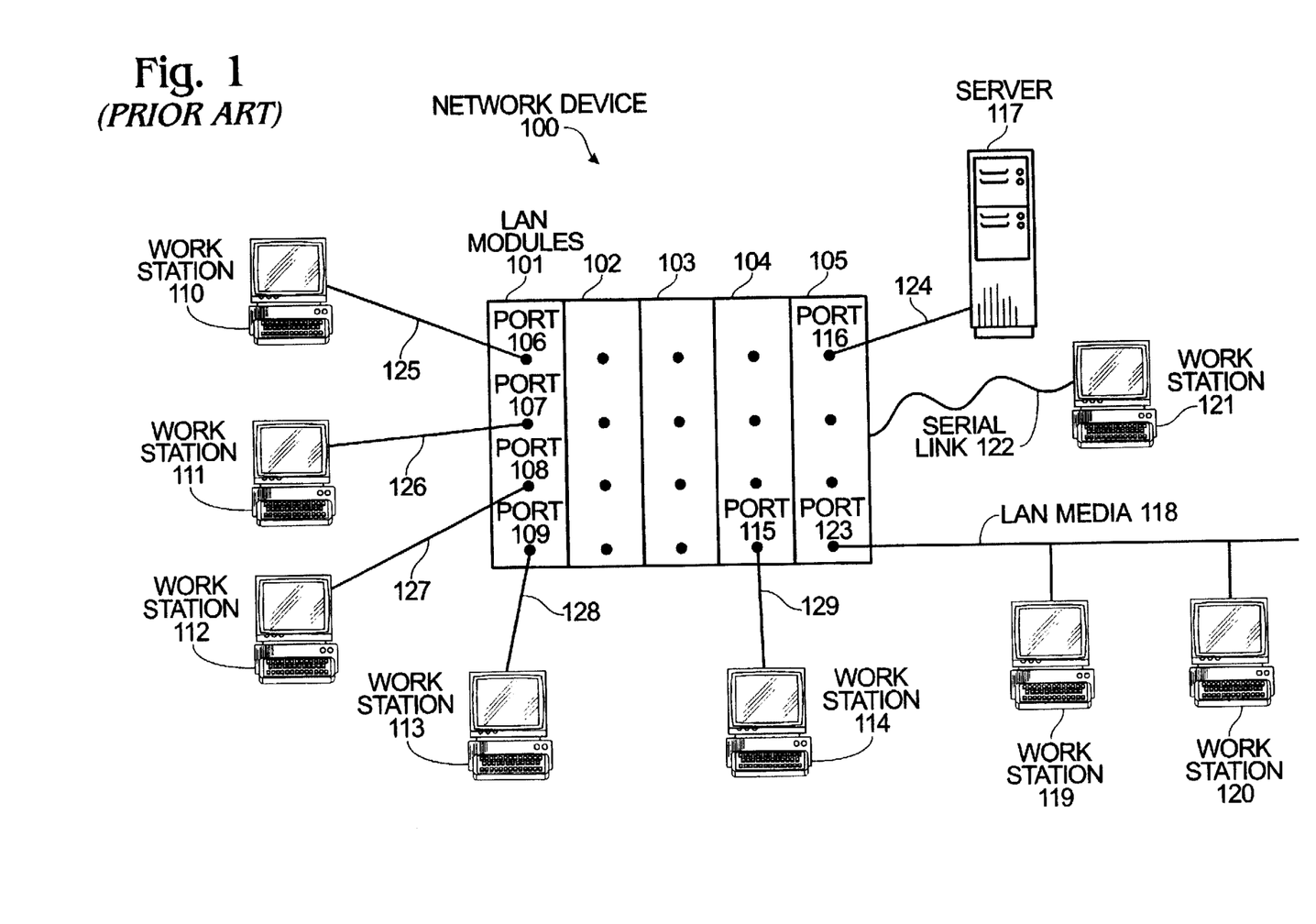
FIG. 1 is a diagram of a network device that may be utilized by an embodiment of the present invention.

Referring to FIG. 1, a network device 100 as may be utilized by an embodiment of the present invention is shown. Network device 100 is a LAN switch, however, it is understood by those of ordinary skill in the art that an embodiment of the present invention may be applied to other network devices such as a hub or bridge. LAN switch 100 interconnects multiple LAN segments each via a port on a LAN module. Different types of LAN modules may be inserted into LAN switch 100, for example, Token Ring, Ethernet, FDDI, or ATM. For example, LAN module 101 may be a Token Ring module interconnecting workstations 110–113 each coupled to a port 106–109, respectively. Module 105 is an Ethernet module, to which is coupled via port 116 a server 117. Further coupled to module 105 is a shared media LAN 118, to which multiple devices such as workstations 119 and 120 are attached.

A network administrator typically manages the configuration and operation of the LAN switch via workstation 121, which may be a sophisticated network management workstation. Device 121 may be coupled to LAN switch 100 via a serial asynchronous communications cable 122 to a serial port (not shown) or it may be attached to a LAN port, depending on the type of LAN environment.

Figure 5:
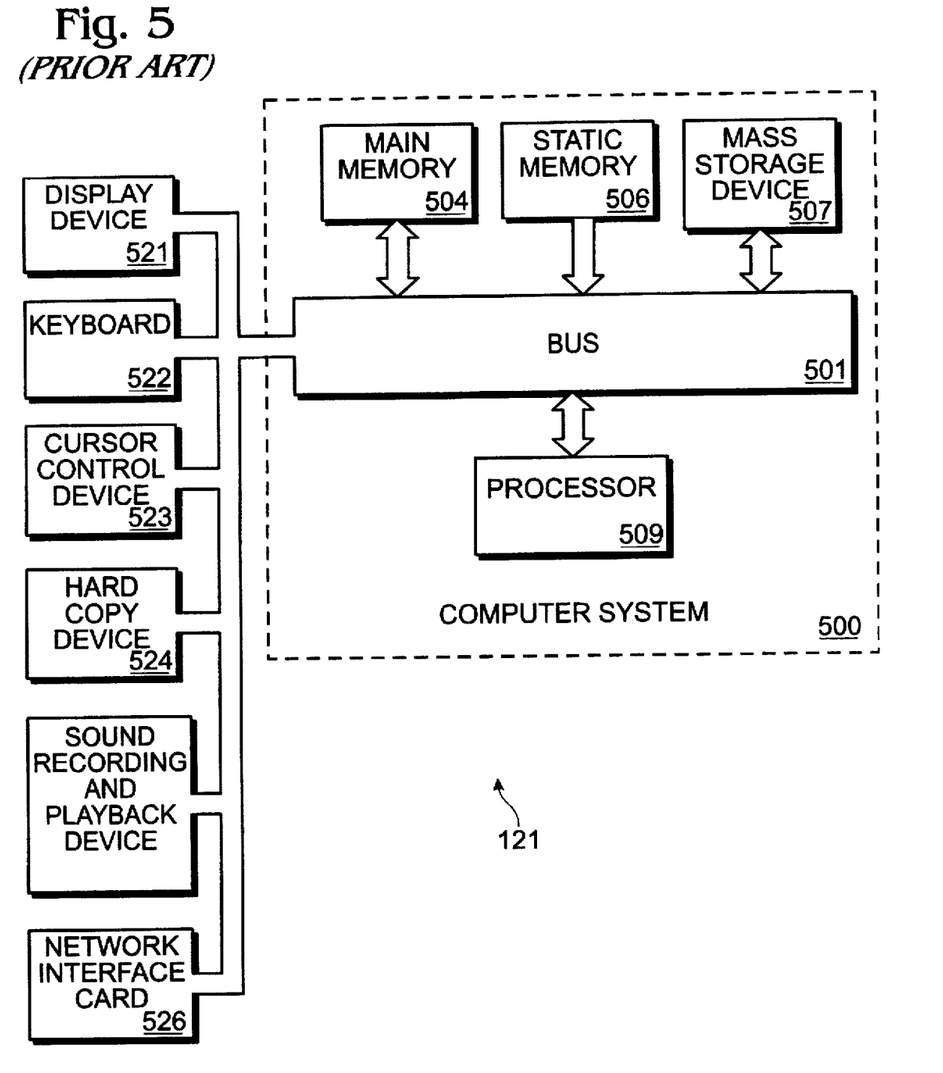
FIG. 5 is a block diagram of a computer system as may be utilized by an embodiment of the present invention.

Referring to FIG. 5, network management station 121, as may be utilized by an embodiment of the present invention is shown. Computer system 500 comprises a bus 501, or other communications hardware and software, for communicating information, and a processor 509 coupled with bus 501 for processing information. System 500 further comprises a random access memory (RAM) or other dynamic storage device 504 (referred to as main memory), coupled to bus 501 for storing information and instructions to be executed by processor 509. Computer system 500 also comprises a read only memory (ROM) 506, and/or other static storage device, coupled to bus 501 for storing static information and instructions for processor 509. Mass storage device 507, such as a magnetic or optical disk and its corresponding disk drive, is coupled to bus 501 for storing information and instructions.

Computer system 500 can also be coupled via bus 501 to a display device 521 for displaying information to a computer user such as a network manager or network administrator. Display device 521 may be used to display windows containing views of network devices, objects, and configuration. Display device 521 can include a frame buffer, specialized graphics rendering devices, a cathode ray tube (CRT), and/or flat panel display. An alphanumeric input device 522, including alphanumeric and other keys, is typically coupled to bus 501 for communicating information and command selections to processor 509. Another type of user input device is cursor control device 523, such as a mouse, a trackball, a pen, a touch screen, or cursor direction keys for communicating direction information and command selections to processor 509, and for controlling cursor movement on display device 521.

Another device that may be coupled to bus 501 is a hard copy device 524 which may be used for printing instructions, data, or other information on a medium such as paper, film, or similar types of media.

Network interface card 526 is coupled to bus 501. Network interface card 526 is further coupled to the external computer network 130 as illustrated in FIG. 1. Network interface card 526, in conjunction with appropriate data communications protocols (e.g., the TCP/IP suite of internetworking protocols), provide the means by which a network management system operating on computer system 500 exchanges information with other devices coupled to the same computer network such as LAN switch 100.

Computer system 500 and network management application software stored and executed therein as part of the network management system fully support Simple Network Management protocol (SNMP). Commercially available computer systems implementing the features of computer system 500 may include a broad range of operating system-based computers or workstations capable of running a graphical user interface such as Microsoft Windows, HP OpenView or IBM NetView/6000. Furthermore, the present invention may be used in conjunction with a network management platform to yield an operational network management station platform upon which an embodiment of the present invention may be implemented.

Embodiment of the present Invention

Figure 2:
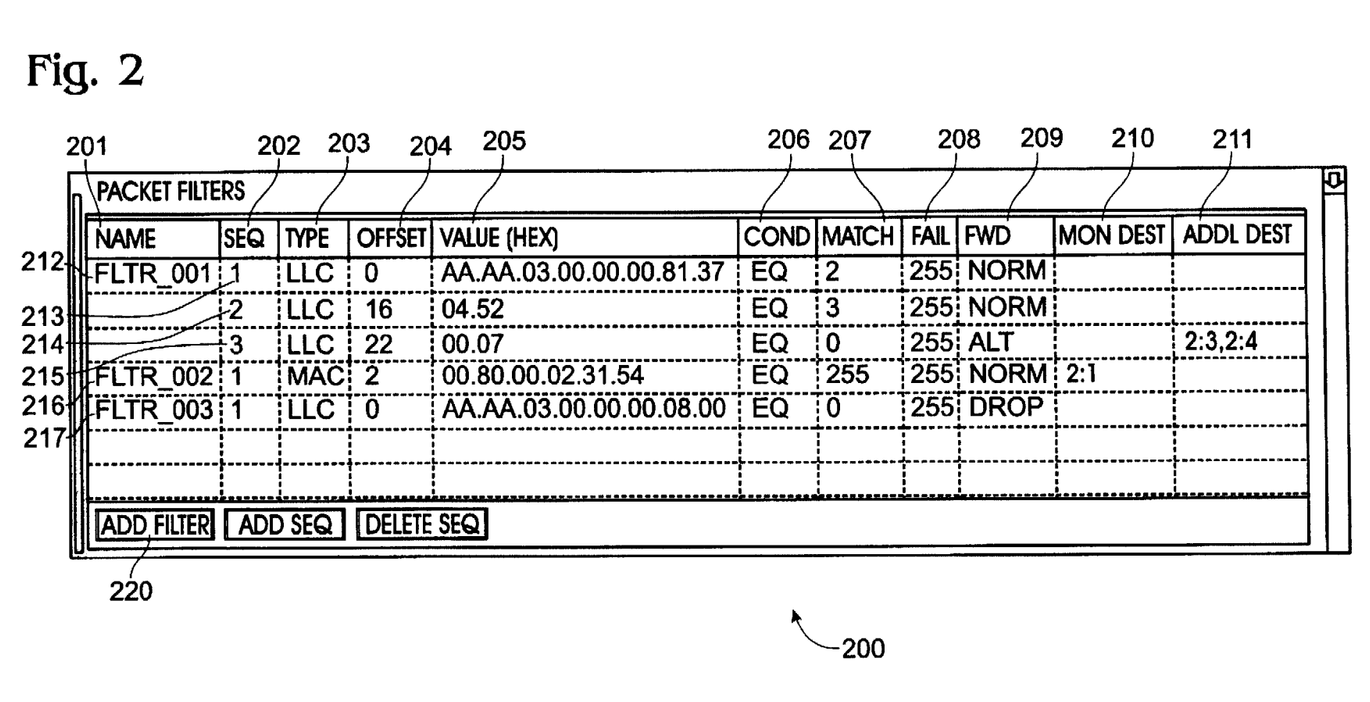
FIG. 2 illustrates a user interface as may be used to implement an embodiment of the present invention.

With reference to FIG. 2, a graphical user interface as may be utilized by an embodiment of the present invention is shown. Window 200 provides a graphical interface on the display device 521 of the network management station 121 through which a network administrator may enable packet filtering on a network device such as LAN switch 100. In general, a packet filter directs a network device to forward certain packets to a specified set of destination ports or to drop the packet, i.e., discard the packet. Filtering may be used to limit the ports from which broadcast packets are sent, control access to network segments and devices, redirect traffic to ports in addition to or rather than the normal destination port(s). (It should be noted that network devices such as a LAN switch or bridge operate at the MAC sublayer of the Data Link layer of the OSI model. Generally, these devices forward packets based on the destination MAC address in the packet. These devices maintain a data structure or the like associating MAC addresses of devices in the network with the port out which the device may be reached over the network. When a packet is received on a port of the network device, the data structure is consulted to determine the proper port, i.e., the normal destination port, out which the packet should be sent to reach the device having the same MAC address as the destination MAC address specified in the packet). Packet filtering may also be used to trace traffic for analysis.

An embodiment of the present invention allows the network administrator to apply multiple filters to the same packet, in a sequential manner. The filters can specify whether a packet should be forwarded to the normal destination port, forwarded to alternate destination ports, or forwarded to additional destination ports, or dropped.

There are three general steps to defining filters according to the present invention, using the interface provided by window 200. First, the network administrator defines a filter group that may contain at least one filter. The filter group is then applied to a selected port. In one embodiment of the present invention, a port on a network device may accept up to 128 filters. In one embodiment, the filter information is then downloaded from the network management station 121 to the network device such as LAN switch 100 via, for example, the direct serial connection to the network device. The filters become active immediately after the switch is reset. In a second, SNMP-based embodiment, the filters are active immediately upon applying them to a port.

In FIG. 2, window 200 displays three filter groups. Each filter group has a name 201. As will be seen, filter group 212 is named FLTR__001, and redirects all Novell NetWare printer requests to the specific token ring LAN segment to which the printers are attached. The filter group is comprised of three filters. Each filter has, and is identified by, a unique sequence number 202. Filter 213 has a sequence number of 1, filter 214 has a sequence number of 2, and filter 215 has a sequence number of 3. Filter 213 checks for IPX packets, filter 214 checks for IPX SAp packets, and filter 215 checks for printer requests.

As another example, filter group 216 named FLTR__002 is comprised of one filter having a sequence number of 1. The filter forwards all packets destined to a device having a MAC address of 008000023154(hex) to a monitoring device or analyzer attached to module 2, port 1, in addition to the normal destination port. The last filter group 217, named FLTR__003, drops IP packets.

Figure 3:
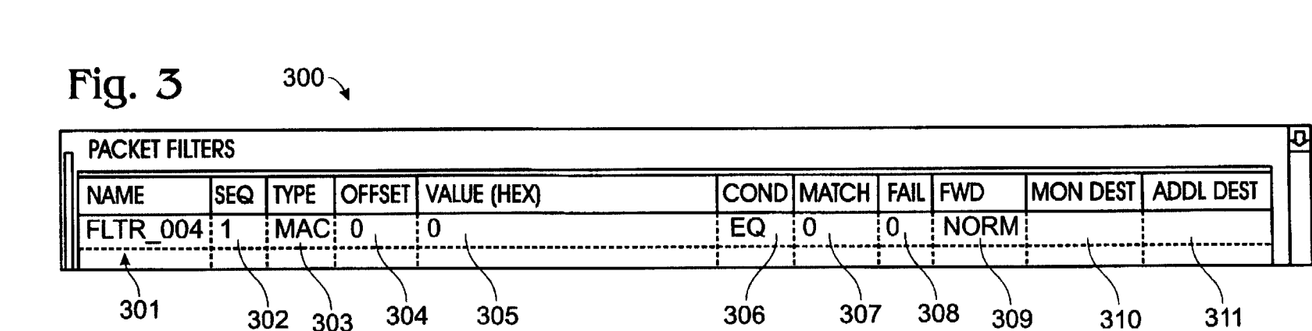
FIG. 3 illustrates a user interface as may be used to define a filter according to the present invention.

To add a filter group, the network administrator selects the add filter button 220 in window 200. With reference to FIG. 3, an embodiment of a window 300 appears on the display device of the network management station. In window 300 a placeholder for a filter appears, as illustrated. The network administrator can edit the fields as follows.

The name field 301 specifies a multicharacter name for a filter group. The name will appear in the list of filters that the network administrator selects for each port. The sequence number field 302 provides a unique number identifying a filter within a filter group. (It should be noted in FIG. 3 there is only one such filter specified. FIG. 2 illustrates multiple filters within filter group 212).

Figure 4:
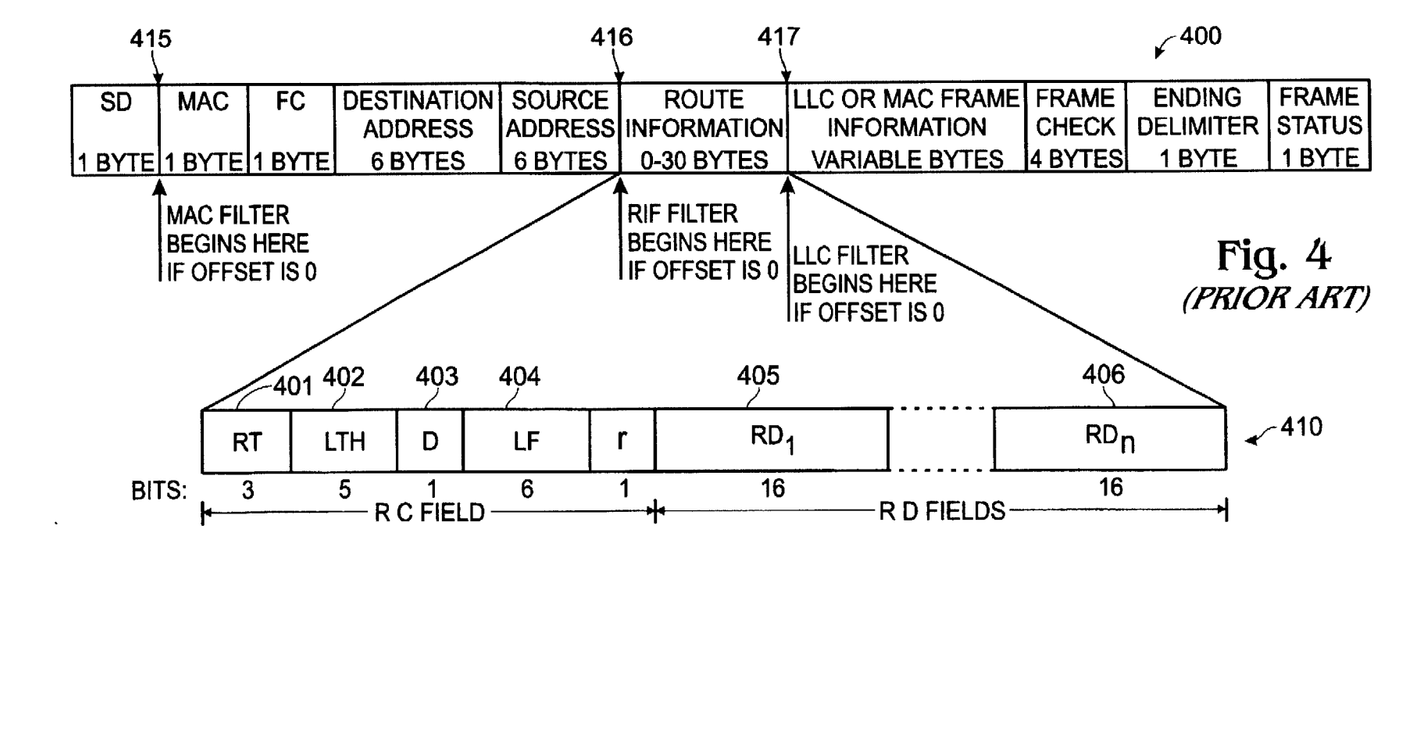
FIG. 4 is a diagram of an IEEE 802.5 token ring data packet.

The type field 303 indicates the offset specified in offset field 304 is calculated from the beginning of a well known field within a data packet. In one embodiment, the type may be either MAC, LLC or RIF. As an example, FIG. 4 illustrates the location of the well known fields with respect to an IEEE 802.5 token ring packet 400. The media access control (MAC) field begins at point 415, the routing information field (RIF) begins at point 416, and the logical link control (LLC) field begins at point 417. It is useful to specify an offset from the beginning of a well known field rather than calculate the offset from the beginning of packet 400 at which the network administrator is comparing the contents of a field at that location in the data packet with the value specified in the filter at value field 305. Additionally, as is the case with a token ring packet 400, the presence of a variable length field, e.g., the routing information field, makes it difficult to calculate from the beginning of the packet the offset of a particular field beyond the variable length field. In such a case, it is easier to calculate an offset from the beginning of a well known field of fixed length, e.g., the LLC field at point 417.

The offset field 304 indicates the beginning of a field within the data packet to be examined, as expressed in the number of bytes from the beginning of the specified type field (in the case of type MAC or LLC) or as expressed by a unique number associated with each well known field within a field specified in the type field (in the case of type RIF). FIG. 4 illustrates the well known fields in the RIF: routing type (RT) field 401, 3 bits; length (LTH) field 402, 5 bits; direction (D) field 403, 1 bit; largest frame size (LF) field 404, 6 bits; reserved field, 1 bit; and route designator (RD1, . . . , RDn) fields (only two fields, 405 and 406, shown), 16 bits each. Each route designator field is further broken down into a ring number, bridge number sequence, wherein the ring number is comprised of 12 bits and the bridge number is comprised of 4 bits. Generally, in the case of a token ring packet, it is advantageous to identify each field within the routing information field in this manner rather than a value representing an absolute offset from the beginning of the RIF, because of the variable length nature of the RIF.

In one embodiment, each of the fields in the RIF are assigned a number. If the routing information indicator (RII) bit in the MAC source address field is not set, the RIF type filter will fail. The number assigned to each field in the RIF may be as follows:

0—compare the value to the contents of the RT field;

1—compare the value to the contents of the length field;

2—compare the value to the contents of the largest frame size field;

3—compare the value to the contents of the first ring number in the RD fields (Note—the filter must take into consideration the value of the direction bit in order to determine in which order to read the RD field);

4—compare the value to the first bridge number;

5—compare the value to any ring number;

6—compare the value to any bridge number;

7—compare the value to the last bridge number; and,

8—compare the value to a bridge number, ring number pair, i.e., a route descriptor.

The value field 305 specifies in hexadecimal the value to compare with the contents of a data packet at the location within the packet determined by the value of the type and offset fields. The condition field 306 allows six types of comparisons. The value in the value field can be compared to the contents of a data packet at the offset specified to determine if the value is equal (EQ), not equal (NE), less than (LT), less than or equal to (LE), greater than (GT), or greater than or equal to (GE) the contents of the data packet.

The match and fail fields, 307 and 308, respectively, specify a sequence number. The match field specifies the sequence number of a subsequent filter in the same filter group to be applied if the condition specified in the present filter is met, i.e., if the value specified in the value field matched (according to the condition specified) the contents of a data packet at the location determined by the type and offset fields. If no other filters should be applied, an entry of zero (0) is used to indicate such. The fail field 308 indicates the sequence number of a subsequent filter to apply in the same filter group if the specified condition is not met. If the network administrator does not want to apply any subsequent filters, then a value of zero (0) can be specified. For example, with reference now to FIG. 2, if a match occurs in filter 213, then filter 214 is applied, because the match field in filter 213 specifies a sequence number of 2. Likewise, filter 215, having a sequence number of 3, is applied if a match occurs in filter 214. It is important to note that although in the present example the filters 213, 214 and 215 are identified by sequence numbers 1, 2 and 3 and each filter identifies the next filter in the filter group if a match occurs, this is not necessary. A filter group may have many filters, each of which may specify the sequence number of a subsequent filter in the group if a match or no match occurs. The sequence number of the subsequent filter can be that of any subsequent filter in the filter group, not necessarily the next subsequent filter in the group. Thus, the network administrator is able to control the sequencing of filters within a filter group, and may skip or jump from a filter to another filter within the same filter group as desired.

To apply the first filter in the next filter group, e.g., to jump from a filter in filter group 212 to the first filter (and in this case, the only filter) in filter group 216, the network administrator defines a sequence number in the match or fail field of the present filter greater than the number of entries in the present filter group. For example, if a filter group has three filters, the network administrator may define a sequence number greater than 3 (e.g., "4" or "255") to apply the first filter in the next filter group.

The fwd field 309 indicates the forwarding action to take with respect to a data packet whose contents match the value specified in value field 305 of the present filter. There are three values that may be specified to indicate the manner in which a packet is processed by the network device: NORM, DROP, and ALT. A value of normal (NORM) indicates the data packet is to be forwarded by the network device to the normal destination port, or ports as the case may be, as well as any destination ports specified in the monitor destination field (mon dest) 310 and the additional destination field (addl dest) 311. A value of drop (DROP) indicates the data packet is to be discarded by the network device. A value of alternate (ALT) indicates the data packet is to be forwarded, but only to the destination ports specified in the monitor destination and the additional destination fields. The packet is not to be forwarded to the normal destination port(s).

It is important to note with respect to the forwarding actions described above that the processing action specified for the packet is not actually taken unless there are no subsequent filters, or, if subsequent filters are specified, a match does not occur with those filters. In other words, processing is performed on a packet only once, according to the forwarding action defined by the last filter for which a match occurred.

The monitor destination field 310 identifies a single port to which a monitoring device such as a LAN analyzer is connected. In an embodiment of the present invention, the port is specified according to the card or module number followed by the port number on the card, delineated by a colon, e.g., 2:1 specifies module 2, port 1. This field is ignored if the forwarding action specified is DROP. The additional destination field 311 specifies additional forwarding destination ports for a packet meeting the condition specified. As with the monitor destination field, the additional destination ports are specified by module number, port number in the form of module:port, wherein multiple destination ports are separated by a comma, e.g., 1:3,2:4. These ports are likewise ignored if the forwarding action specified is DROP.

Conclusion

There are, of course, alternatives to the described embodiment which are within the understanding of one of ordinary skill in the relevant art. The present invention is intended to be limited only by the claims presented below.

Thus, what has been described is a method and apparatus for filtering data packets received or transmitted at a port of a network device, such as a LAN switch, based on the content of the data packets.

We claim:

1. A method for redirecting data frames in a network comprising the steps of:
   receiving a data frame at a port of a network device coupled to said network said data frame to be forwarded to a destination node in said network based on a destination address for said destination node associated with said data frame;
   comparing contents of said data frame with a user defined filter; and,
   processing said data frame depending on said user defined filter, wherein processing said data frame comprises the step of forwarding said data frame in said network device to at least one of a monitor port, a destination port associated with said destination node, or an additional destination port associated with an additional node other than said destination node or dropping said data frame, depending on said user defined filter.

2. The method as set forth in claim 1, wherein said user defined filter comprises a type value and an offset value.

3. The method as set forth in claim 2, wherein said type value identifies a variable length field and said offset value identifies one of a plurality of fields within said variable length field by a unique number associated with said one of a plurality of fields.

4. The method as set forth in claim 3, wherein said variable length field is a routing information field.

5. The method as set forth in claim 4, wherein said field within said variable length field is a well known field.

6. The method as set forth in claim 5, wherein said well known field is a routing type field.

7. The method as set forth in claim 5 wherein said well known field is a length field.

8. The method as set forth in claim 5, wherein said well known field is a longest frame size field.

9. The method as set forth in claim 5 wherein said well known field is a ring number field.

10. The method as set forth in claim 5 wherein said well known field is a bridge number field.

11. The method as set forth in claim 5 wherein said well known field is a route descriptor field.

12. The method as set forth in claim 2, wherein said type value identifies a fixed length field and said offset value identifies a field within said fixed length field.

13. The method of claim 12, wherein said offset value is specified in bytes.

14. A method for configuring filters in a network device for redirecting data frames in a network connected thereto, comprising the steps of:
   configuring according to user input received by the network device a first filter, said first filter comprising a first value, a first condition, and an identification of a second filter if said first condition is met; and
   configuring according to user input received by the network device a second filter, said second filter comprising a second value and a second condition.

15. The method as set forth in claim 14, wherein said first filter further comprises a forwarding action and a port on which to apply said forwarding action if said first condition is met and said second condition is not met.

16. The method as set forth in claim 15, wherein said first condition is defined to compare whether the contents of a data frame are equal to said first value.

17. The method as set forth in claim 15, wherein said first condition compares whether the contents of a data frame are not equal to said first value.

18. The method as set forth in claim 15, wherein said first condition compares whether the contents of a data frame are less than said first value.

19. The method as set forth in claim 15, wherein said first condition compares whether the contents of a data frame are less than or equal to said first value.

20. The method as set forth in claim 15, wherein said first condition compares whether the contents of a data frame are greater than said first value.

21. The method as set forth in claim 15, wherein said first condition compares whether the contents of data frame are greater than or equal to said first value.

22. In a network device coupled to a network, a method of controlling a data frame transmitted on said network, comprising the steps of:
   a) comparing the contents of said data frame to a first filter;

b) if said contents of said data frame match said first filter:
   1) setting a forwarding action for said data frame;
   2) jumping to a second filter identified by said first filter;
   3) performing said forwarding action on said data frame if said contents of said data frame do not match said second filter;
c) if said contents of said data frame do not match said first filter, jumping to a third filter identified by said first filter.

23. The method as set forth in claims 22, wherein said forwarding action comprises the step of forwarding said data frame to a normal destination port.

24. The method as set forth in claim 22, wherein said forwarding action comprises the step of dropping said data frame.

25. The method as set forth in claim 22, wherein said forwarding action comprises the step of forwarding said data frame to a destination port other than a normal destination port.

26. The method as set forth in claim 25, wherein said destination port other than said normal destination port is a monitor destination port.

27. The method as set forth in claim 25, wherein said destination port other than said normal destination port is an additional destination port.

28. A method of processing data frames in a network device coupled to a network comprising the steps of:
   a. setting a default forwarding action for said data frames;
   b. comparing the contents of a data frame to a first filter;
   c. if said contents of said data frame match said first filter,
      1) setting a first forwarding action for said data frame;
      2) if a second filter is identified by said first filter, jumping to said second filter;
      3) if said second filter is not identified by said first filter, performing said first forwarding action on said data frame;
   d. if said contents of said data frame do not match said first filter, and
      1) if a third filter is identified by said first filter, jumping to said third filter;
      2) if said third filter is not identified by said first filter, performing said default forwarding action on said data frame.

29. The method as set forth in claim 28, wherein said step c. 2) further comprises the steps of:
   a) comparing said contents of said data frame to said second filter;
   b) if said contents of said data frame match said second filter,
      1) setting a second forwarding action for said data frame;
      2) if a fourth filter is identified by said second filter, jumping to said fourth filter;
      3) if said fourth filter is not identified by said second filter, performing said second forwarding action on said data frame;
   c) if said contents of said data frame do not match said second filter, performing said first forwarding action on said data frame unless a subsequent filter is identified by said second filter.

* * * * *